(12) United States Patent
McLinden et al.

(10) Patent No.: US 11,747,514 B1
(45) Date of Patent: Sep. 5, 2023

(54) REMOTE SENSING ATMOSPHERIC PRESSURE PROFILES THROUGH COMBINED RADAR AND/OR RADIOMETER MEASUREMENTS

(71) Applicant: United States of America as represented by the Administrator of NASA, Washington, DC (US)

(72) Inventors: Matthew McLinden, Greenbelt, MD (US); Gerald Heymsfield, Greenbelt, MD (US); Lihua Li, Greenbelt, MD (US); Joel Susskind, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 562 days.

(21) Appl. No.: 16/878,978

(22) Filed: May 20, 2020

(51) Int. Cl.
- *G01W 1/02* (2006.01)
- *G01S 13/86* (2006.01)
- *G01S 13/95* (2006.01)
- *G01W 1/10* (2006.01)

(52) U.S. Cl.
CPC ............... *G01W 1/02* (2013.01); *G01S 13/86* (2013.01); *G01W 1/10* (2013.01); *G01S 13/953* (2013.01)

(58) Field of Classification Search
CPC ......... G01S 13/953; G01S 13/86; G01W 1/02
See application file for complete search history.

(56) References Cited

U.S. PATENT DOCUMENTS

| 5,117,689 A * | 6/1992 | Gary ..................... G01W 1/08 73/178 R |
| 2017/0299695 A1* | 10/2017 | Piepmeier ............. G01S 7/4021 |
| 2018/0131453 A1* | 5/2018 | Sharma .................. H04B 17/14 |
| 2019/0170871 A1* | 6/2019 | Henderson ............ G01S 13/589 |

FOREIGN PATENT DOCUMENTS

CN  106291487 A * 1/2017 ............. G01S 13/70

* cited by examiner

*Primary Examiner* — Erin F Heard
*Assistant Examiner* — Helena H Seraydaryan
(74) *Attorney, Agent, or Firm* — Christopher O. Edwards; Trent J. Roche

(57) ABSTRACT

An apparatus configured to scan radar and radiometer combination used to image 3D atmospheric pressure from high altitudes or space. The apparatus includes a microwave sensor configured to operate at a V-band between a range of 51 and 71 GHz, producing high fidelity retrievals of one or more pressure and temperature profiles. The sensor includes a broadband transmitter and one or more receivers with three or more transmitted and received radar frequencies. The three or more transmitted and received frequencies are used to provide an estimate of atmospheric oxygen absorption in atmosphere. The sensor is further configured to provide vertical pressure profiles by combining three radar frequency data from the three or more transmitted and received radar frequencies with vertical temperature information.

18 Claims, 5 Drawing Sheets

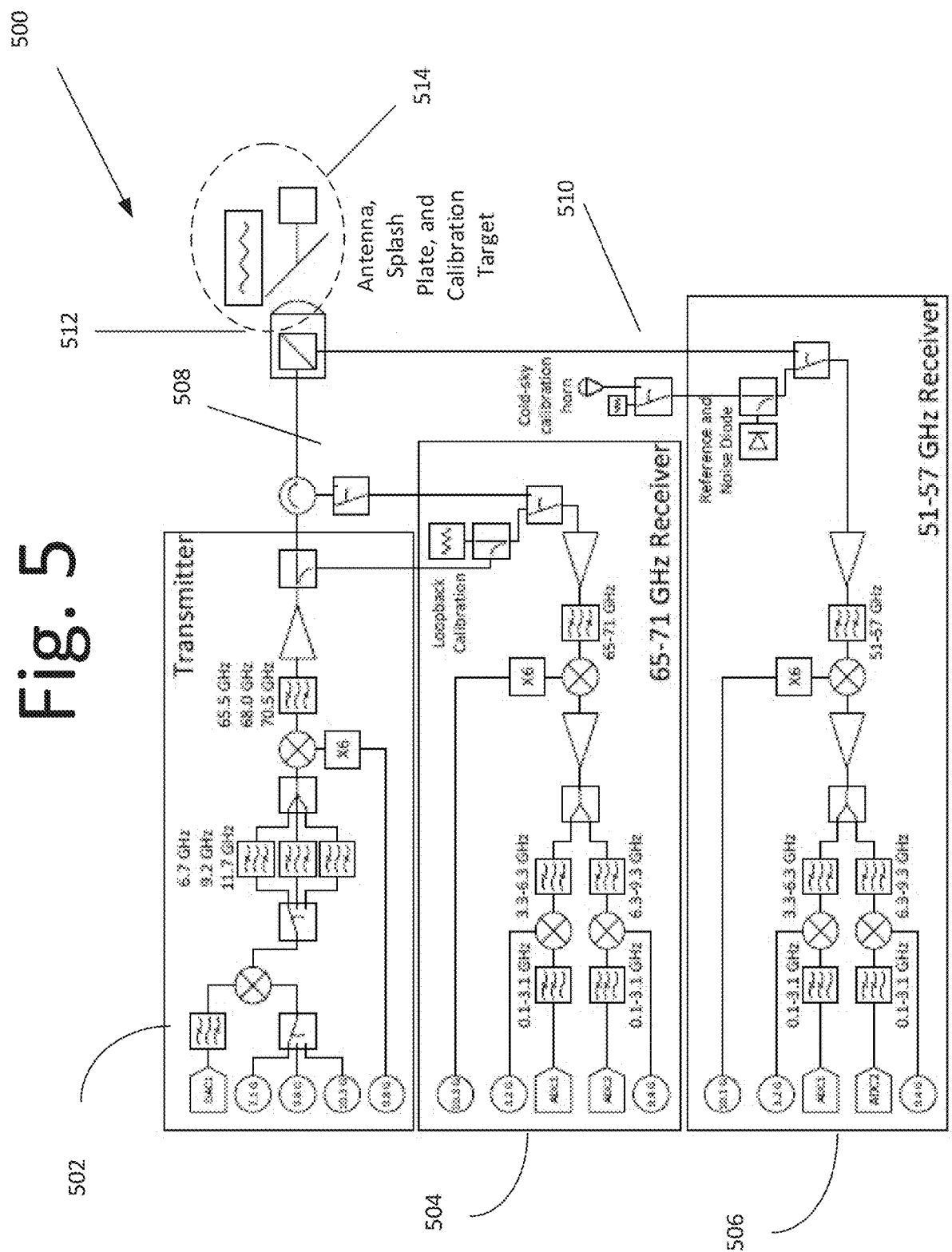

REMOTE SENSING ATMOSPHERIC PRESSURE PROFILES THROUGH COMBINED RADAR AND/OR RADIOMETER MEASUREMENTS

STATEMENT OF FEDERAL RIGHTS

The invention described herein was made by employees of the United States Government and may be manufactured and used by or for the Government for Government purposes without the payment of any royalties thereon or therefore.

FIELD

The present invention relates to imaging three dimensional (3D) atmospheric pressure, and more particularly, to a scanning radar and radiometer combination used to image 3D atmospheric pressure from high altitudes or space.

BACKGROUND

Atmospheric pressure is a fundamental measurement used for weather forecasting and wind estimation. Atmospheric pressure defines the hydrostatic and geostrophic components of the atmosphere, and is used as a vertical coordinate in atmospheric modeling and remote sensing Currently, there is no existing way to remote sense atmospheric pressure. Thus, a technique to measure atmospheric pressure in multiple dimensions is needed.

SUMMARY

Certain embodiments of the present invention may provide solutions to the problems and needs in the art that have not yet been fully identified, appreciated, or solved by current techniques to measure atmospheric pressure. For example, some embodiments of the present invention pertain to a technique to measure atmospheric pressure in multiple dimensions.

In an embodiment, an apparatus includes a microwave sensor configured to operate at a V-band between a range of 51 and 71 GHz, producing high fidelity retrievals of one or more pressure and temperature profiles. The sensor includes a broadband transmitter and one or more receivers with three or more transmitted and received radar frequencies. The three or more transmitted and received frequencies are used to provide an estimate of atmospheric oxygen absorption in atmosphere. The sensor is further configured to provide vertical pressure profiles by combining three radar frequency data from the three or more transmitted and received radar frequencies with vertical temperature information.

In another embodiment, an apparatus includes an active-passive sensor is configured to operate at a V-band between a range of 51 and 71 GHz, producing high fidelity retrievals of one or more pressure and temperature profiles. The active-passive sensor comprises a broadband transmitter and a plurality of receivers, and is placed on a high-altitude aircraft with pressure at a cruising altitude being less than 20 hPa.

In yet another embodiment, an apparatus includes an active-passive sensor is configured to operate at a V-band between a range of 51 and 71 GHz, producing high fidelity retrievals of one or more pressure and temperature profiles. The active-passive sensor comprises a broadband transmitter and a plurality of receivers, and is placed on a high-altitude aircraft with pressure at a cruising altitude being less than 20 hPa. One of the plurality of receivers uses a 10.1 GHz oscillator and X6 multiplier to down convert a 51-57 band radio frequency (RF), and another one of the plurality of receivers uses a 10.28 GHz oscillator and X6 multiplier to down convert a 65-71 band RF.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a block diagram illustrating a pressure profiling system, according to an embodiment of the present invention.

DETAILED DESCRIPTION OF THE EMBODIMENTS

Figure 1:
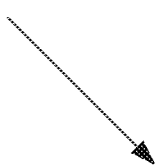
FIG. 1 is a graph illustrating a standard atmospheric oxygen absorption versus frequency at V-band (40-75 GHz), according to an embodiment of the present invention.
Figure 1:
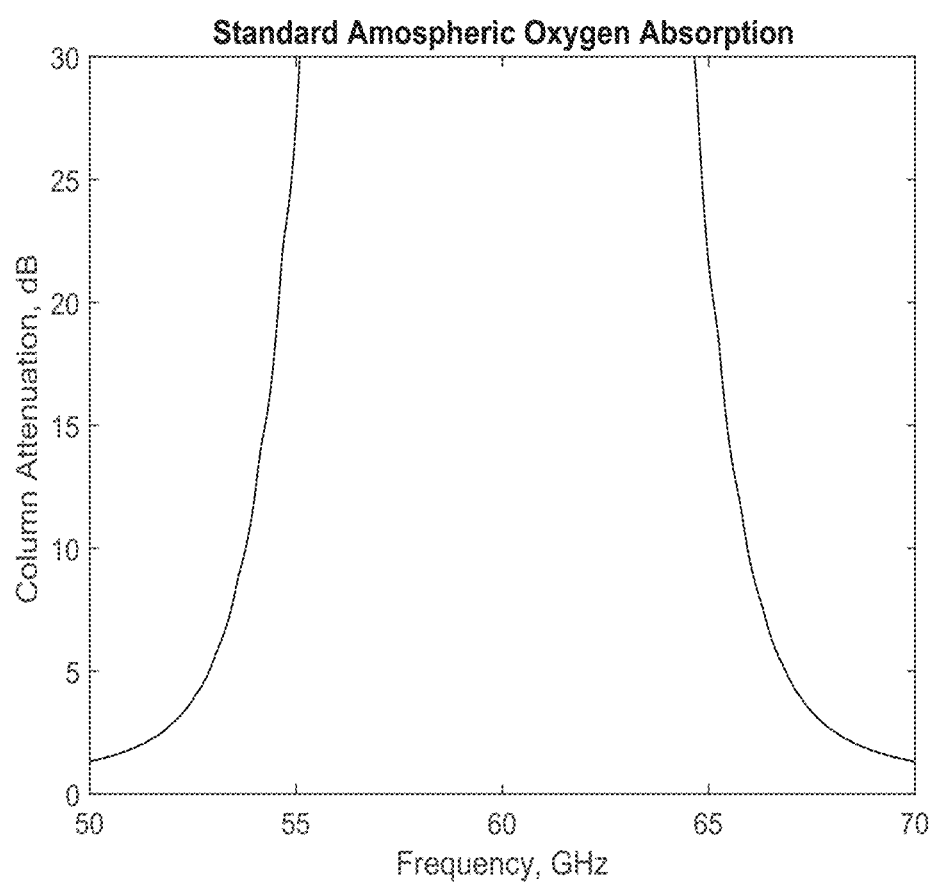

Atmospheric pressure profiles, often displayed as surface pressure contours combined with pressure level geopotential heights, are a critical tool for modeling, visualizing, sensing, and understanding the atmospheric processes of our planet. Pressure is a primary output of global models, and is often used as a vertical coordinate in remote sensing. Current methods for observing atmospheric pressure profiles rely only on in situ measurements. This leaves large sections of our planet with only sparse retrievals of this critical information.

The uses of atmospheric pressure retrievals are diverse and compelling. Atmospheric pressure gradients allow for the estimation of the magnitude and direction of horizontal winds and for the identification of frontal zones and cyclones. Surface pressure provides insight to the strength of tropical cyclones and the vertical pressure profiles provide information on the warmcore structures. Atmospheric pressure imagery over the ocean provides insight on the early formation of weather systems away from dense land-based or ocean buoy networks. Finally, atmospheric pressure is used as the vertical coordinate of many passive remote sensing retrievals, and therefore, accurate knowledge of pressure is required to correctly reference pressure based observations to geometric altitude.

Some embodiments pertain to a pressure profiling system, with both active and passive channels operating at a V-band (e.g., 51-71 GHz) to retrieve global atmospheric pressure profiles. This pressure profiling system may be used over the ocean where data is currently most sparse.

As widely known that oxygen ($O_2$) is well mixed in the atmosphere, a measurement of the total column oxygen provides the total vertical column dry air, and thus, the surface pressure due to dry air. Microwave signals experience significant attenuation due to $O_2$ absorption near 51-71 GHz. By measuring the differential attenuation at two frequencies, a differential absorption radar (DAR) is configured to provide estimates of column O2, and in turn, surface pressure due to dry air.

However, atmospheric water vapor is also a contributing factor to the total air pressure. Atmospheric temperature, water vapor, clouds and precipitation all have effects on radar differential attenuation measurement and dry air pressure retrieval. A DAR with a single pair of radar frequencies cannot remove the errors in air pressure retrievals caused by the uncertainties of atmospheric temperature, water vapor, clouds, and precipitation.

Certain embodiments of the present invention addresses these issues. For example, a pressure profiling system addresses the need for atmospheric pressure observation in a wholistic way. In one example, a pressure profiling system combines necessary measurements in a compact, highly integrated V-band sensor. Passive (radiometric) channels provide temperature profiles. Active (radar) measurements utilize three radar frequencies to reduce uncertainties caused by water vapor, clouds, and precipitation on $O_2$ differential attenuation measurements. Thus, this pressure profiling system dry air pressure estimates are significantly improved compared to the conventional DAR.

Further, the addition of water vapor sounding (using existing instrumentation and technology) provide the estimate of surface pressure due to atmospheric water vapor. The combination of total surface pressure with temperature profiles further allows retrievals of vertical pressure profiles (or pressure level geostrophic heights) through the hypsometric equation, integrating vertical atmospheric thickness from the surface upward.

Microwave pressure profiling system temperature sounding and DAR retrievals will both use the V-band (51-71 GHz) $O_2$ composite line feature shown in FIG. 1. FIG. 1 is a graph 100 illustrating a standard atmospheric oxygen absorption versus frequency at V-band, according to an embodiment of the present invention. Frequency ranges used for passive and active remote sensing to achieve a pressure retrieval are highlighted in FIG. 1. While the lower frequency (51-57 GHz) side of the V band $O_2$ absorption feature is also ideal for both DAR and temperature sounding due to reduced impact from water vapor and precipitation, spectrum allocation regulations preclude the use of active sensing at these frequencies. Thus, this pressure profiling system may only transmit in the 65-71 GHz upper sideband. The novel three-frequency two DAR pair technique mitigates the impact of water vapor, clouds, and precipitation.

Pressure Retrievals

Radar measurements of the surface normalized radar cross section (NRCS) at multiple frequencies along an oxygen absorption feature provides an estimate of the total oxygen in the atmospheric column. The DAR technique using two frequencies has long been identified as a potential source of surface pressure retrievals.

The microwave absorption spectrum of $O_2$ is a function of temperature, so any surface pressure retrieval implicitly assumes a vertical temperature profile. The pressure profiling system temperature profile retrieval is critical to achieve a high-quality estimate of the column $O_2$, with errors as high as 0.3 hPa surface pressure per degree Kelvin bias in total-column atmospheric temperature from our simulations. Additionally, $O_2$ absorption provides an estimate of the surface pressure from dry air. Atmospheric water vapor reduces the mixing ratio of oxygen while contributing to the mass of the atmospheric column.

The differential atmospheric attenuation from $O_2$ is combined with other sources of apparent differential attenuation including clouds and precipitation, water vapor, and surface backscatter. While these sources of differential attenuation are small compared to $O_2$, these sources contribute significantly to uncertainty in final surface pressure retrievals.

One approach to mitigate the effects of these sources, impacts and flag data of the sources are estimate. For instance, the radar could be used to provide flags for precipitation, and wind speed from model data could be used to estimate the surface backscatter. This approach becomes problematic for global sensing, and introduces multiple sources of error. Model data used to correct these effects are large-scale such that localized differences will not be resolved. The radar itself may be used to flag precipitation, but light precipitation and heavy clouds are missed. Further, regions with clouds and precipitation are key to correctly characterizing weather structures.

Figure 2:
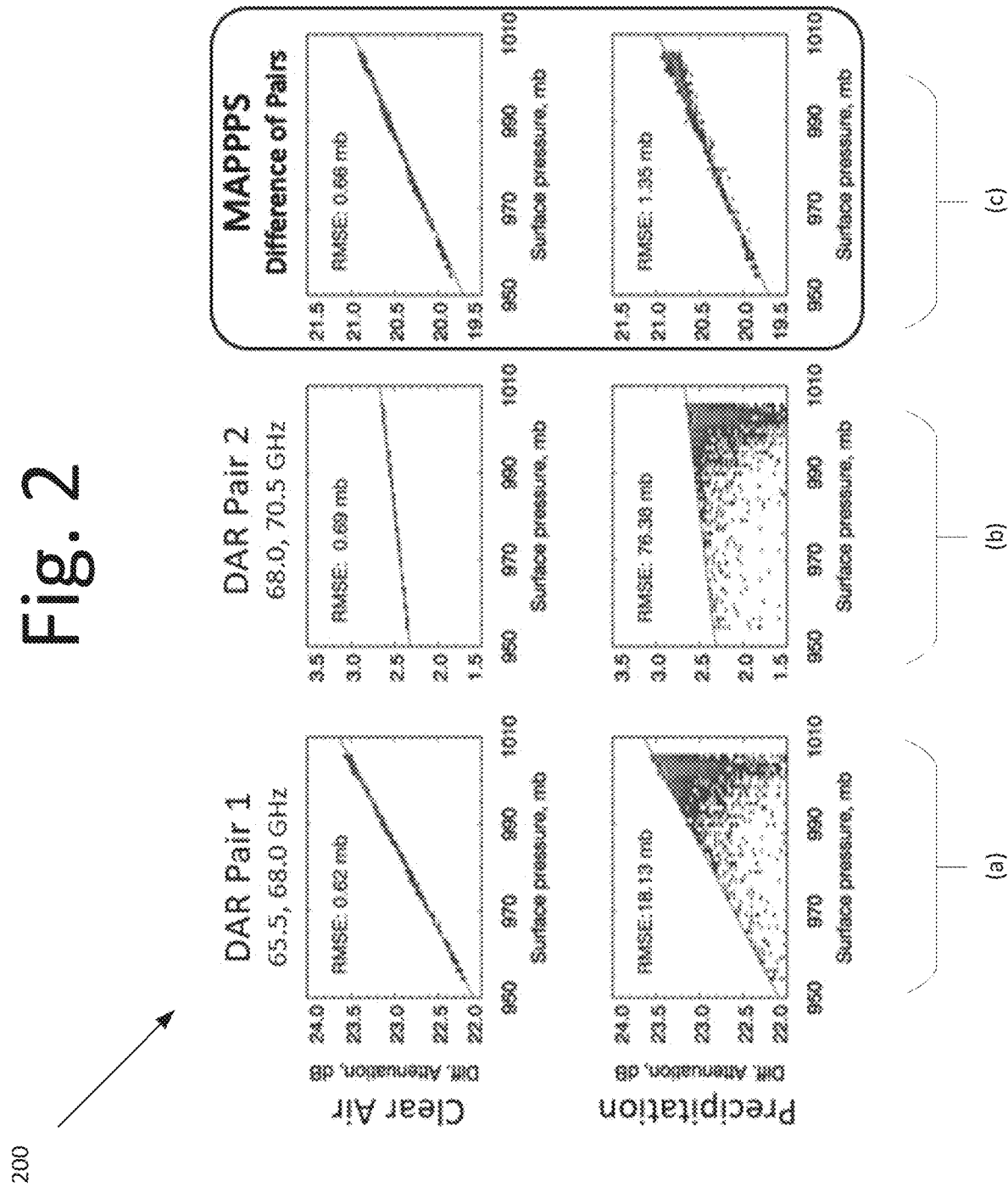
FIG. 2 is an illustration showing a pressure profiling system significantly mitigating errors from precipitation and water vapor by using three radar frequencies, according to an embodiment of the present invention.

However, this pressure profiling system mitigates errors from of non-oxygen attenuation by using three radar frequencies to generate two differential attenuation estimates. See, for example, FIG. 2, which is an illustration 200 showing this pressure profiling system significantly mitigating errors from precipitation and water vapor by using three radar frequencies, according to an embodiment of the present invention. Columns (a)-(c) shows the relationship between differential attenuation and pressure from simulations. The column (c) is the difference between the columns (a) and (b), and demonstrates the reduced impact of light precipitation with the pressure profiling system three-frequency algorithm.

The attenuation from these sources varies approximately linearly in dB over the range of spectrum utilized by the active portion of this instrument. A first transmit frequency (nominally 65.5 GHz) is heavily attenuated by $O_2$. The second frequency (nominally 68.0 GHz) acts as the primary reference to determine the atmospheric absorption due to $O_2$. A third frequency (nominally 70.5 GHz) combined with the second frequency provides an estimate of the differential attenuation due to all nonoxygen sources. With the assumption of non-oxygen attenuation sources varying linearly (in dB) with frequency, $$(\alpha_{atm}(f_1)-\alpha_{atm}(f_2))-(\alpha_{atm}(f_2)-\alpha_{atm}(f_1)) \approx \alpha_{O2}(f_1) + \alpha_{O2}(f_3) - 2\alpha_{O2}(f_2)  \quad \text{Equation (1)}$$

where $\alpha_{atm}$ is the measured atmospheric loss in dB due to all sources and $\alpha_{O2}$ is the loss due to oxygen alone. With the vertical temperature profile, this three-frequency differential measurement is invertable to provide an estimate of total column oxygen.

With surface pressure as a reference, concurrent temperature profiling additionally allows for the estimation of the full atmospheric pressure profile using the hypsometric equation, relating atmospheric thickness and pressure gradients. Vertical pressure resolution is set by the resolution of temperature profiling, approximately 3 km.

Vertical Temperature Profile

Temperature profiles are critical for both the surface pressure estimate and for retrieving the vertical pressure profile. Co-locating a V-band temperature profiler with the radar is important for reducing SWaP, coalignment and calibration errors. For this reason, in some embodiments, the combined active/passive instrument include internal and external calibration sources and an advanced digital receiver enabling concurrent synchronized operation between the radar and radiometer.

Figure 3:
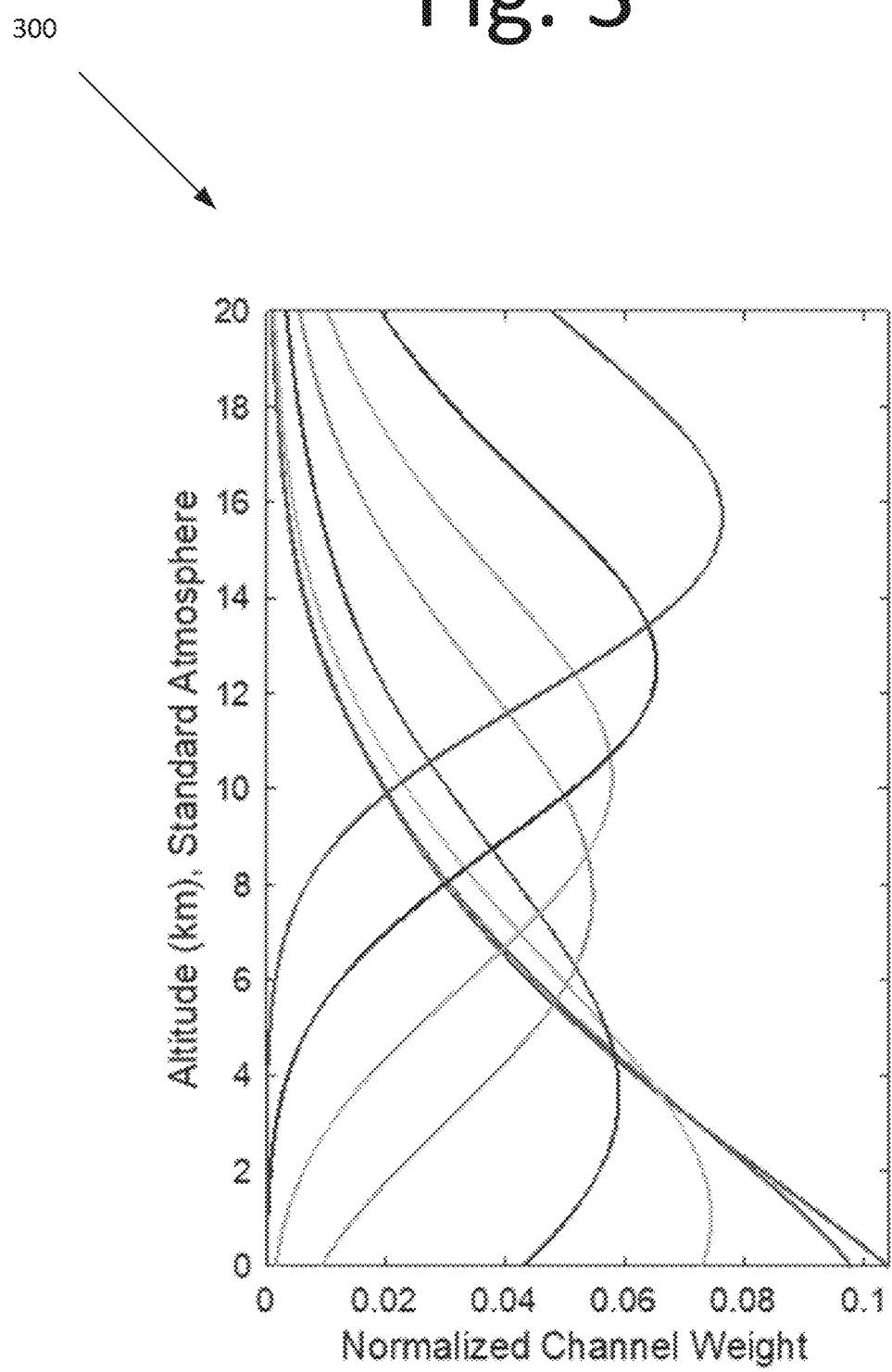
FIG. 3 is a graph illustrating the range weighting function of frequency channels used for passively retrieving atmospheric temperature, according to an embodiment of the present invention.

FIG. 3 is a graph 300 illustrating the vertical weighting functions of radiometric retrievals of atmospheric temperature, according to an embodiment of the present invention. These passive temperature retrievals set the vertical resolution of the atmospheric pressure retrievals.

Water Vapor

Water vapor measurements are required for accurate surface pressure retrievals due to the column weight of water vapor and the dry-air assumption of the oxygen mixing ratio. Compact water vapor sounding radiometers are mature technology and may be deployed with this instrument to provide the necessary water vapor retrieval. Some embodiments described herein focus on the development of the critical V-band and digital subsystems for $O_2$ differential attenuation and temperature sounding.

System Architecture

This microwave pressure profiling system utilizes a combined active-passive sensor at V-band (51-71 GHz) to produce high fidelity retrievals of pressure and temperature profiles. While radars and radiometers often provide mutually beneficial measurements, they have traditionally been built as separate instruments, leading to increased Size, Weight, and Power (SWaP). In cases where radars and radiometers have been built to share an antenna aperture, such as the L-band Aquarius and Soil Moisture Active Passive (SMAP) Instruments, the radar and radiometer electronics were built as separate instruments. These electronics were built using a diplexer to share the antenna.

In an embodiment, a highly integrated active/passive system produces the scatterometry and brightness temperature measurements for pressure profile retrievals. This active/passive system includes a single receiver at each polarization for the radar and radiometer, and a synchronized digital processor that is shared by the active and passive channels. A high-speed analog-to-digital converters (ADCs) sample both the radar and radiometer channels, with the sampled bandwidth ranging from 100 to 3100 MHz. All final down conversion and channelization may occur digitally in field-programmable gate array (FPGA) firmware, adding frequency flexibility to the design and significantly simplifying the receiver hardware as compared to conventional designs.

Scanning is possible with either conical or cross-track geometry. Conical scanning may simplify calibration with a fixed off-nadir angle, but may complicate instrument geometry and may not allow for near-nadir observation. For purposes of some of the embodiments described herein, cross-track scanning from an aircraft platform is selected to allow for increased flexibility including testing the retrieval performance at multiple off-nadir incidence angles.

In an additional embodiment, water vapor profiling may be implemented. For example, water vapor profiling may be implemented by including a miniaturized 183 GHz radiometer. For this embodiment, a V-band transceiver is loaded onto a NASA ER-2 high altitude aircraft along with the Conical Scanning Millimeter-wave Imaging Radiometer (CoSMIR) millimeter wave radiometer to provide water vapor profiles. See, for example, FIG. 4, which is a diagram illustrating pressure profiling system 400 within the high-altitude aircraft, according to an embodiment of the present invention.

Platform

While the proposed measurement is highly suitable for SmallSat platforms given the modest SWaP and antenna aperture required in low earth orbit (LEO), demonstration of this instrument in a relevant environment is first required to increase the TRL and pave the way for such a flight mission. A relevant environment in this case dictates high altitude (~20 km above mean sea level), as the physical retrieval relies on measuring the full vertical column air mass.

Figure 4:
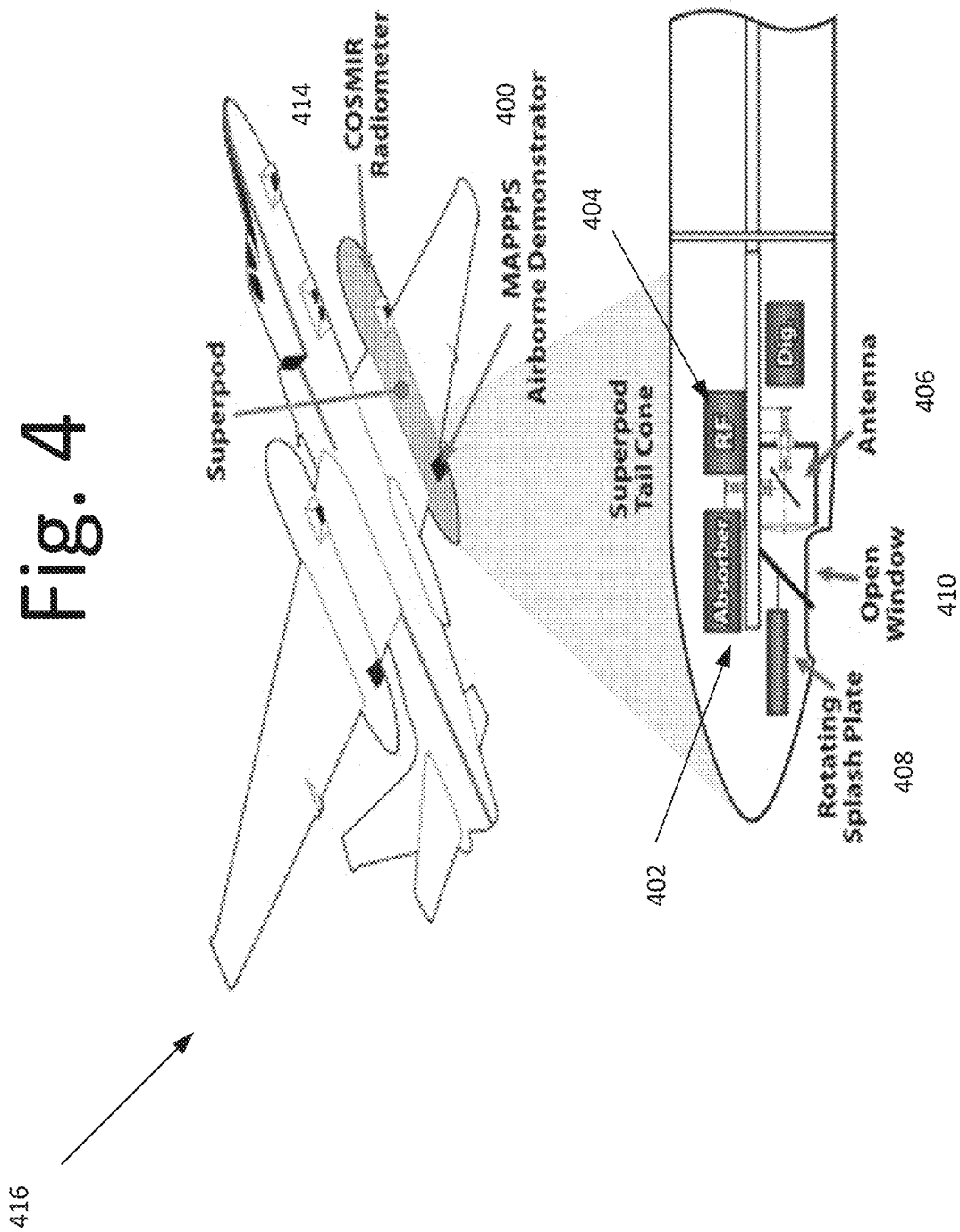
FIG. 4 is a diagram illustrating a pressure profiling system within the high-altitude aircraft, according to an embodiment of the present invention.

As shown in FIG. 4, an ER-2 high-altitude aircraft 416 is selected as the optimum platform for explanation purposes only. The reason for selecting ER-2 high-altitude aircraft 416 is that the pressure at its cruising altitude is less than 20 hPa. This allows for the measurement to be corrected for the residual air mass above aircraft 416. The CoSMIR radiometer 414 flies operationally on ER-2 high-altitude aircraft 416, and can provide co-located water vapor measurements.

An embodiment of this technology on the NASA ER-2 includes a lens antenna 406 redirected to allow cross-track scanning by a rotating splash plate 408. The antenna beam is pointed through an open window 410 or at temperature-controlled calibration absorbers 402. The RF subsystem 404 transmits radar waveforms and receives both radiometric signals and the radar receive signals. The received signals are down converted and processed by a digital receiver 412.

Technology

Some embodiments include an airborne demonstrator to advance the pressure profiling system technology readiness for space, developing the compact instrument technology applicable for future spaceflight missions. Beyond the advanced underlying measurement, some embodiments combine radar and radiometer measurements in a highly integrated system, with reduced SWaP and improved performance for obtaining both surface backscatter and brightness temperature profiles.

With modern radio frequency (RF) and digital receiver technologies, the system provides excellent performance for both radar and radiometer measurements. The active/passive V-band transceiver in some embodiments utilizes compact MMIC technologies developed for the telecommunications industry to enable a high-performance radar and radiometer design.

FIG. 5 is a block diagram illustrating a pressure profiling system 500, according to an embodiment of the present invention. The pressure profiling system 500 avoids spurious mixing products from broadband transmitter 502 and digitizes two 6 GHz bands with a common receiver design 504, 506.

As shown in FIG. 5, each RF receiver 504, 506 receives a 6 GHz bandwidth within the range of 51 to 71 GHz, controlled by the selection of a local oscillator frequency and a single front-end filter. Received RF signals are down converted to an intermediate frequency (IF), then split into two sub-channels each with a 3 GHz bandwidth. This allows the direct sampling and processing of the full bandwidth by two 6.2 GSPS ADCs.

The advanced digital transceiver 502 enables high-speed and broadband sampling of both the radar and radiometer signals. Transceiver 502 utilizes high speed FPGA and digital to analog converter (DAC) devices to generate fully programmable radar waveforms using the frequency diversity technique. These waveforms (or radar echo signals) are received simultaneously and synchronized with radiometer brightness temperatures. Transceiver 502 may receive in some embodiments eight or more radiometer channels within the 6 GHz temperature-sounding band. High-speed synchronization of radiometer brightness temperature may allow radar and radiometer receive time to be shared within a radar pulse repetition interval, with radiometer internal calibration occurring during each radar receiving cycle.

In some embodiments, a combined active/passive pressure profiling system 500 offers significant advantages for instrument development, such as shared components to reduce SWaP; enabling more complex science product retrievals; co-aligned measurements for better matching field of view; and a more complete integrated combined observing system design. In one embodiment, radar sub-bands (65-71 GHz) are transmitted and received through the H-pol port of the antenna 508, while radiometer sub-bands (51-57 GHz) are received through the V-pol port 510. The fractional bandwidth of each receiver is 11 percent. This pressure profiling system 500 utilizes a 0.38 m lens antenna 512 with a polarization grid to provide high cross-polarization isolation between the active/passive channels. As shown in item 514, splash plate and motor assembly are used for cross-track scanning and radiometer external calibration. The scan axis is oriented along the aircraft flight path, and the beam position is recorded by a motor encoder and sent to a system command & data handling (C&DH) board.

The radar and receiver channels, while separated by polarization at 512, share a common MMIC based heterodyne design covering 51 GHz to 71 GHz with a 6 GHz IF bandwidth selectable by local oscillator (LO) frequency. The RF up- and down-conversion uses broadband allium Arsenide (GaAs) multi-function MMICs with RF performance from 50 GHz to 72 GHz and IF of 0-12 GHz.

In an embodiment, passive channel receiver 506 uses a 10.1 GHz oscillator and X6 multiplier to downconvert the 51-57 band. In a further embodiment, active channel receiver 504 uses a 10.28 GHz oscillator and X6 multiplier to downconvert the 65-71 GHz band. After the first stage of downconversion, each IF section is split into two 3 GHz bands, and is further downconverted to the inputs of both receivers 504, 506. Receivers 504, 506 perform final digital downconversion of the radar and radiometer channels. This is described in more detail below.

Transmitter 502 uses a combination of mixers and filters to produce RF waveforms in three bands (e.g., 65.5, 68, 70.5 GHz). This broad-band upconversion system minimizes spurious radiation from mixing products. In some embodiments, the transmit waveform signal is amplified by a pulsed solid state power amplifier (SSPA). SSPA performance is optimized at 65.5 GHz where oxygen absorption is highest among the three radar frequencies, and has reduced power up to 70.5 GHz.

Both radar receiver 504 and radiometer receiver 506 use a front-end switch to redirect the receivers to internal calibration. The receiver 504 uses coupled power from transmitter 502 to track changes in the transmit power receiver-gain product, while receiver 506 points to a reference load and coupled noise diode. A small horn pointed out the top of the ER-2 aircraft may provide a cold-space calibration at the ER-2 cruising altitude. In addition to the internal radiometer calibration within receiver 506, two calibration loads are located on the top of the scan arc, one for ambient temperature (cold at aircraft flight altitude) and one heated to 20° C. as the hot load. Temperature sensors are used to monitor the thermal condition over these loads.

A FPGA based waveform generator and digital receiver may provide instrument transmit waveforms and timing signals as well as may channelize and process active and passive signals. The significant processing power capability of these components allows for broadband receiving with dual ADCs for each receiver, each with a 3200 MHz bandwidth.

It should be appreciated that this pressure profiling system allows for the generation and processing of arbitrary frequency-diverse waveforms. For example, three waveforms are processed simultaneously using digital channelization. During the radar receive period, each pulse is recorded as a separate digital sub-channel using a Numerically Controlled Oscillator (NCO) inside the digital receiver firmware. Each radar channel is digitally downconverted, match-filtered, and accumulated into profiles. Bandwidth, chirp length, and amplitude tapering of the waveforms is fully programmable.

It should be appreciated, however, that this may be modified to address the unique challenges associated with broadband radiometry. Eight to ten radiometer bands, each up to 400 MHz wide, may be down-converted, filtered, passed through square-law detection, and may be averaged and accumulated in synchronization with radar profiles. This radiometer receiver 506 architecture and processing allows radar and radiometer data to be fully synchronized for the first time.

With brightness temperature data accumulated and averaged in radar range-time, complex interactions between the radar and radiometer, such as those occurring due to power supply ripple associated with enabling the SSPA, can be identified and mitigated. Isolated periods of crosstalk, for instance, due to unusually strong radar reflections are blanked from radiometer data in post-processing without the loss of significant radiometer integration time.

In some embodiments, radar channels use the ocean surface as a reference for $O_2$ differential attenuation measurements. The unique advantage of differential attenuation measurements is that system variation common to the frequencies is cancelled. However, due to the separation of the three radar bands, system parameters, such as SSPA output power and receiver gain, could respond slightly differently to ambient temperature and pressure changes. The internal calibration loop provides profile-by-profile sampling to track the variation of the system parameters.

Some embodiments generally pertain to the use of scanning radar and radiometer combination to image 3D atmospheric pressure from high altitudes or space. The radar uses differential scatterometry on an oxygen absorption line in the microwave region to estimate the atmospheric pressure at the surface. In an embodiment, two or more frequencies of different oxygen absorption are used to estimate the oxygen in the atmospheric column. As oxygen is mixed in the atmosphere, this gives an estimate of surface pressure.

In a further embodiment, adding to this estimate, a radiometric temperature profiler also using the oxygen absorption spectrum is used. Further, by combining the surface pressure with vertical temperature profiles the hypsometric equation is used to estimate vertical pressure profiles. Cross-track or conical scanning on a moving platform may allow for three-dimensional pressure measurements of the atmosphere.

In some further embodiments, the radar measures the NRCS of the surface at two or more frequencies along an oxygen absorption line. For example, depending on the embodiment, the oxygen absorption may be in the range of 50-70 GHz oxygen. By comparing the measured NRCS at frequencies of differing oxygen absorption, the radar measures the amount of oxygen in the atmospheric column. It should be noted that oxygen is mixed in the atmosphere, which gives a measure of the surface pressure. The use of more than two frequencies reduces uncertainty by estimating and removing the impacts other atmospheric features, such as water vapor, on this measurement.

The radiometer uses the oxygen absorption feature to measure vertical temperature profiles using the commonly known methods, for example. Although neither a two-frequency DAR nor the radiometer alone are novel by themselves, the combination of a three or more frequency DAR and radiometer is unique and nonobvious. For example, when the radar and radiometers are co-located or combined into a single instrument, both the temperature profiles and the surface pressure can be measured at the same location and time. It should be appreciated that the hypsometric equation gives the difference in pressure at any altitude given a known pressure at one altitude combined with a temperature profile. The hypsometric equation is used with the surface pressure radar and the radiometer temperature profiler to provide vertical pressure profiles.

Further, a nadir- or off nadir-pointing instrument on a moving platform in space provides a two-dimensional (2D) (vertical and along-track) estimate of atmospheric pressure. A scanning instrument on the moving platform further provides a 3D (vertical, along-track, and cross-track) estimate of atmospheric pressure.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a microwave sensor configured to operate at a V-band between a range of 51 and 71 GHz, producing high fidelity retrievals of one or more pressure and temperature profiles, Including obtaining vertical temperature information, wherein
the microwave sensor comprises a broadband transmitter and one or more receivers with three or more transmitted and received radar frequencies, the three or more transmitted and received frequencies are used to provide an estimate of atmospheric oxygen absorption in atmosphere, and
the microwave sensor is further configured to provide vertical pressure profiles by combining three radar frequency data from the three or more transmitted and received radar frequencies with vertical temperature information.

2. The apparatus of claim 1, wherein the passive sensor is placed on an aircraft or spacecraft.

3. The apparatus of claim 1, wherein the vertical temperature information allows an improved estimate of surface pressure as well as a full atmospheric pressure profile by estimating the atmospheric thickness.

4. The apparatus of claim 1, wherein the sensor is further configured to receive radiometric temperature profiles using a combined radar and radiometer design with combined receiver hardware.

5. The apparatus of claim 1, wherein the one or more receivers receive a 6 GHz bandwidth radio frequency (RF) signal within the range of 51 to 71 GHz, controlled by a selection of a local oscillator frequency and a single front-end filter.

6. The apparatus of claim 4, wherein the RF signal received by the one or more receivers are down converted to an intermediate frequency (IF) signal and split into two sub-channels with a 3 GHz bandwidth.

7. The apparatus of claim 1, wherein the broadband transmitter is configured for high-speed and broadband sampling of radar and radiometer signals.

8. The apparatus of claim 5, wherein the broadband transmitter comprises a high speed field programmable gate array (FPGA) and a digital-to-analog converter (DAC) configured to generate fully programmable radar waveforms,
the waveforms are received simultaneously and synchronized with radiometer brightness temperatures, allowing for radar and radiometer receive time to be shared within a radar pulse repetition interval, with radiometer internal calibration occurring during each radar receiving cycle.

9. The apparatus of claim 1, further comprising:
an antenna comprising a first polarization configured to receive and transmit radar sub-bands ranging between 65 to 71 GHz and a second polarization configured to receive and transmit radiometer sub-bands ranging between 51 to 57 GHz.

10. An apparatus, comprising:
an active-passive sensor is configured to operate at a V-band between a range of 51 and 71 GHz, producing high fidelity retrievals of one or more pressure and temperature profiles, wherein
the active-passive sensor comprises a broadband transmitter and a plurality of receivers, and is placed on a high-altitude aircraft with pressure at a cruising altitude being less than 20 hPa: wherein one of the plurality of receivers uses a 10.1 GHz oscillator and X6 multiplier to down convert a 51-57 band radio frequency (RF).

11. The apparatus of claim 10, wherein a second one of the plurality of receivers uses a 10.28 GHz oscillator and X6 multiplier to down convert a 65-71 band radio frequency (RF).

12. The apparatus of claim 10, wherein each of the plurality of receivers are configured to split an intermediate frequency (IF) into two 3 GHz bands.

13. The apparatus of claim 10, wherein each of the plurality of receivers use a front-end switch to redirect receivers to internal calibration.

14. The apparatus of claim 10, wherein one of the plurality of receivers point to a reference load and coupled noise diode.

15. The apparatus of claim 10, wherein the active-passive sensor comprises a transmitter configured to produce three radio frequency (RF) waveforms in a 65.5 GHz band, 68 GHz band, and a 70.5 GHz band.

16. An apparatus, comprising:
an active-passive sensor is configured to operate at a V-band between a range of 51 and 71 GHz, producing high fidelity retrievals of one or more pressure and temperature profiles, wherein
the active-passive sensor comprises a broadband transmitter and a plurality of receivers, and is placed on a high-altitude aircraft with pressure at a cruising altitude being less than 20 hPa,
one of the plurality of receivers uses a 10.1 GHz oscillator and X6 multiplier to down convert a 51-57 band radio frequency (RF), and
another one of the plurality of receivers uses a 10.28 GHz oscillator and X6 multiplier to down convert a 65-71 band RF.

17. The apparatus of claim 16, wherein each of the plurality of receivers are configured to split an intermediate frequency (IF) into two 3 GHz bands.

18. The apparatus of claim 16, wherein the active-passive sensor comprises a transmitter configured to produce three RF waveforms in a 65.5 GHz band, 68 GHz band, and a 70.5 GHz band.

* * * * *